United States Patent [19]
Saito et al.

[11] Patent Number: 5,170,264
[45] Date of Patent: Dec. 8, 1992

[54] COMPRESSION CODING DEVICE AND EXPANSION DECODING DEVICE FOR A PICTURE SIGNAL

[75] Inventors: Osamu Saito; Mikio Watanabe; Kenji Moronaga, all of Tokyo, Japan

[73] Assignee: Fuji Photo Film Co., Ltd., Kanagawa, Japan

[21] Appl. No.: 444,692

[22] Filed: Dec. 1, 1989

[30] Foreign Application Priority Data

Dec. 10, 1988 [JP] Japan .............................. 63-311035
Dec. 13, 1988 [JP] Japan .............................. 63-313004
Feb. 2, 1989 [JP] Japan .............................. 1-22493
Feb. 7, 1989 [JP] Japan .............................. 1-26695

[51] Int. Cl.⁵ .............................................. H04N 1/415
[52] U.S. Cl. .................................... 358/433; 358/426; 358/432
[58] Field of Search .............. 358/432, 433, 426; 382/56; 364/725, 715.04, 521, 518

[56] References Cited

U.S. PATENT DOCUMENTS

| | | | |
|---|---|---|---|
| 4,780,761 | 10/1988 | Daly et al. | 358/133 |
| 4,920,414 | 4/1990 | Remus et al. | 382/56 |
| 4,933,761 | 6/1990 | Murakami et al. | 358/133 |
| 4,933,763 | 6/1990 | Chantelou | 358/136 |
| 4,982,282 | 1/1991 | Saito et al. | 358/427 |

Primary Examiner—Jin F. Ng
Assistant Examiner—Dov Popovici

[57] ABSTRACT

A picture data compression coding device sets a normalizing coefficient which matches a block of picture data and normalizes the picture data by the normalizing coefficient, whereby an adequate compression ratio is selected on a block-by-block basis. The coding device sets a normalizing coefficient in response to the sum of activities of individual blocks and normalizes picture data by the normalizing coefficient, thereby maintaining the amount of coded data constant at all times. Further, the coding device normalizes picture data by multiplying them by a reciprocal of the normalizing coefficient so as to eliminate the need for a divider. A decoding device decodes the data having been coded by the coding device.

13 Claims, 12 Drawing Sheets

Fig. 8A

| -1 | -1 | -1 |
|----|----|----|
| -1 | 8  | -1 |
| -1 | -1 | -1 |

Fig. 8B

| 1  | 2  | 1  |
|----|----|----|
| 0  | 0  | 0  |
| -1 | -2 | -1 |

Fig. 8C

| 1 | 0 | -1 |
|---|---|----|
| 2 | 0 | -2 |
| 1 | 0 | -1 |

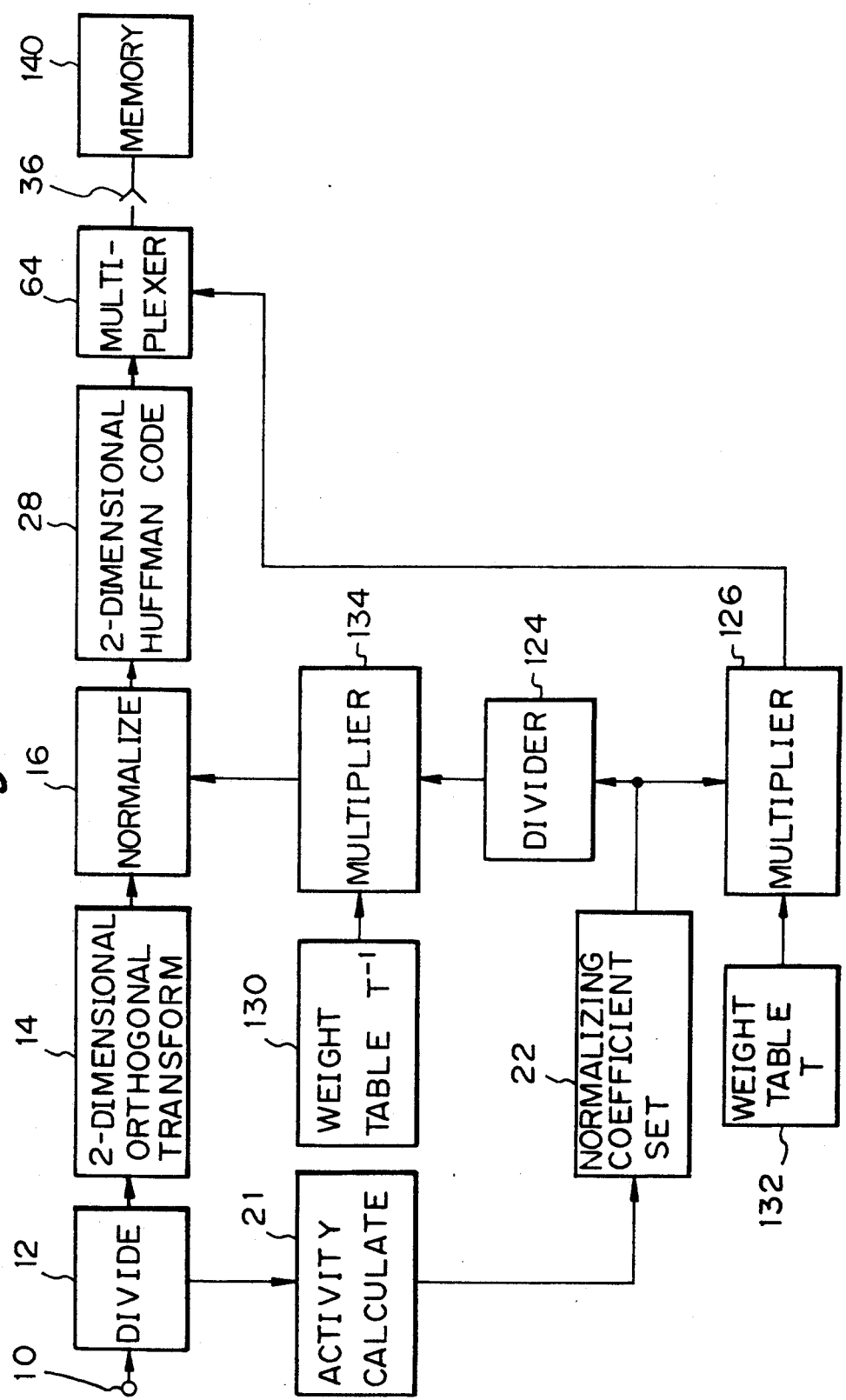

COMPRESSION CODING DEVICE AND EXPANSION DECODING DEVICE FOR A PICTURE SIGNAL

BACKGROUND OF THE INVENTION

1. Field of the Invention

The present invention relates to a device for coding a picture signal by compression and a device for decoding a compressed picture signal by expansion. More particularly, the present invention is concerned with a picture signal compression coding device which maintains the amount of compressed data constant, eliminates distortions in the event of reproduction, which does not use elements operating at high speed, an expansion decoding device for decoding so coded data, and a system including such coding and decoding devices.

2. Description of the Related Art

Digital picture data representative of a picture picked up by an electronic still camera, for example, are stored in a memory. Various kinds of compression coding schemes have been proposed to reduce the amount of such digital picture data and thereby the required memory capacity. Among them, a two-dimensional orthogonal transform coding scheme is extensively used because the coding scheme codes data by a large compression ratio and because the coding scheme allows a minimum of picture distortions particular to coding to occur.

Two-dimensional orthogonal transform coding is such that picture data representative of a single picture are divided into a plurality of blocks, and the picture data are subjected to two-dimensional orthogonal transform block by block. The picture data undergoes orthogonal transform, i.e., transform coefficients are compared with a predetermined threshold so as to discard those transform coefficients which are lower than the threshold. The transform coefficients lower than the threshold are treated as data zero thereafter. The remaining data are divided by a predetermined quantizing step value, or normalizing coefficient, and thereby quantized or normalized by a step size. By this kind of procedure, the values of transform coefficients, i.e., the dynamic range of amplitudes is suppressed.

The two-dimensional orthogonal transform coding procedure stated above has some problems left unsolved. Specifically, coding picture data by applying a predetermined normalizing coefficient to transform coefficients results in the amount of data which is different from one coded picture data to another. Such coded picture data cannot be written in a memory whose capacity is limited without resorting to troublesome processing. More specifically, when a predetermined normalizing coefficient is used, picture data containing many high frequency components will have a large amount of data when coded while picture data containing many low frequency components will have a small amount of data when coded. The coded data of the picture data in which high frequency components are predominant sometimes amounts to five to ten times of the coded data of the picture data in which low frequency components are predominant.

When a particular kind of picture is divided into blocks as stated previously, there occur two different groups of blocks, i.e., a group of blocks containing many high frequency components and a group of blocks containing many low frequency components. Then, despite that the picture as a whole has more high frequency components than low frequency components, for example, some blocks will contain more low frequency components than high frequency components. In this condition, applying a large normalizing coefficient to all the blocks which constitute the picture causes distortions in the normalized picture data of the blocks which contain many low frequency components. This would degrade the quality of a reproduced picture.

Further, the two-dimensional orthogonal transform coding sequence needs division which uses a normalizing coefficient. The division is not practicable without using a high-speed and accurate divider and, therefore, without increasing the scale of the device.

SUMMARY OF THE INVENTION

It is therefore an object of the present invention to provide a picture signal compression coding device which frees a coded picture from distortions, and an expansion decoding device for decoding so coded picture data.

It is another object of the present invention to provide a picture signal compression coding device which maintains the amount of coded picture data constant at all times.

It is another object of the present invention to provide a picture signal compression coding device and a picture signal expanding system which are capable of normalizing picture data without resorting to a divider.

In accordance with the present invention, a picture signal compression coding device for dividing digital picture data representative of a single picture into a plurality of blocks and coding the individual blocks of picture data by two-dimensional orthogonal transform comprises an orthogonal transforming section for applying two-dimensional orthogonal transform to the individual blocks of digital picture data, a normalizing section for normalizing the data transformed by the orthogonal transforming section, a coding section for coding the data normalized by the normalizing section, and a normalizing coefficient setting section for setting a normalizing coefficient to be used by the normalizing section and which matches the digital picture data. The normalizing section normalizes the data by using the normalizing coefficient set by the normalizing coefficient setting section.

Also, in accordance with the present invention, a decoding device for decoding digital picture data representative of a single picture and coded by compression by two-dimensional inverse orthogonal transform comprises a decoding section for decoding the coded picture data, an inverse normalizing section for inversely normalizing the data decoded by the decoding section, an inverse orthogonal transforming section for applying two-dimensional inverse orthogonal transform to the data inversely transformed by the inverse transforming section, and a normalizing coefficient outputting section for feeding normalizing coefficients each being associated with respective one of blocks and inputted together with the coded picture data to the inverse normalizing section. The inverse normalizing section inversely normalizes the data by using the normalizing coefficients outputted by the normalizing coefficient outputting section.

BRIEF DESCRIPTION OF THE DRAWINGS

The objects and features of the present invention will become more apparent from the consideration of the following detailed description taken in conjunction with the accompanying drawings in which:

FIGS. 8A to 8C show filters which are available for the calculation of activities;

FIG. 14 is a schematic block diagram showing a further alternative embodiment of the compression coding device in accordance with the present invention.

DESCRIPTION OF THE PREFERRED EMBODIMENTS

Figure 1:
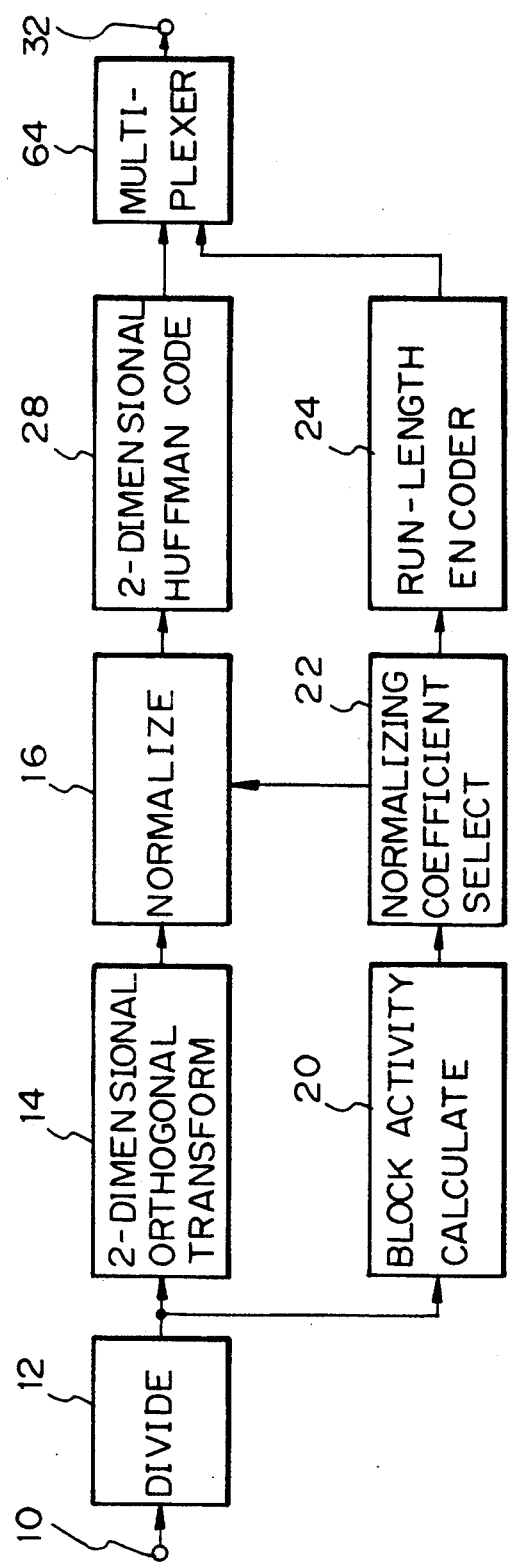
FIG. 1 is a schematic block diagram showing a picture signal compression coding device embodying the present invention.

Referring to FIG. 1 of the drawings, a compression coding device embodying the present invention is shown and includes a dividing section 12 which is implemented by a frame buffer. One frame of still picture data picked up by an electronic still camera, for example, is applied to and stored in the dividing section 12 via an input terminal 10. The dividing section 12 divides the one frame of picture data into a plurality of blocks and delivers them block by block to a two-dimensional orthogonal transforming section 14. The orthogonal transforming section 14 transforms the picture data block by block by discrete cosine transform, Hadamard transform or similar two dimensional orthogonal transform known in the art.

Figure 3:
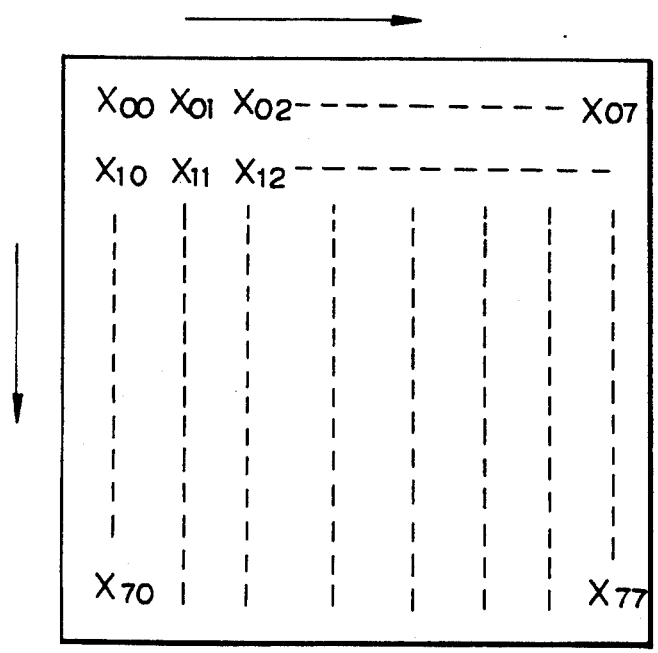
FIG. 3 shows an example of data which has undergone two-dimensional orthogonal transform.

Each block of picture data which has undergone two-dimensional orthogonal transform as stated above is arranged in rows and columns, as shown in FIG. 3. In FIG. 3, the order of data sequentially increases from the top left in directions indicated by arrows. The output of the orthogonal transforming section 14 is fed to a normalizing section 16.

The normalizing section 16 compares the transformed picture data, i.e., transform coefficients from the orthogonal transforming section 14 with a predetermined threshold value so as to discard those coefficients which are smaller than the threshold value. The transform coefficients other than the discarded ones are divided by a predetermined quantizing step size, or normalizing coefficient, $\alpha$ and thereby quantized by the normalizing coefficient $\alpha$. In the illustrative embodiment, two different kinds of normalizing coefficients are available and selected one at a time by a select signal from a normalizing coefficient selecting section 22 which will be described. Specifically, exclusive normalizing coefficients for those blocks which contain high frequency components and exclusive normalizing coefficients for the other blocks which contain low frequency components are stored in a storage, not shown, and are selected by the above-mentioned select signal.

Each block of data from the dividing section 12 is fed to a block activity calculating section 20 also. The block activity calculating section 20 determines the activities of the individual blocks, i.e., the degrees of the individual block to which picture data of high frequency components are predominant.

Assume that each of the divided blocks is constituted by 8×8 pixels, as shown in FIG. 3 by way of example. Then, certain pixel data $X_{ij}$ (i, j = 0, ..., 7) will have an activity ACT (i, j) which is expressed as:

$$ACT(i,j) = \sum_{k=0}^{7} \sum_{l=0}^{7} |X(i+K, j+1) - DC(i,j)|$$

where $$DC(i,j) = 1/64 \cdot \sum_{k=0}^{7} \sum_{l=0}^{7} X(i+K, j+1)$$

As the above equation indicates, the activity ACT (i, j) is determined by averaging the values of the 8×8 pixel data which constitute one block, and adding to the resulting mean value DC (i, j) the absolute values of the differences between the individual pixel data and the mean value DC (i, j). More specifically, the individual pixel data of one block are added, and then the sum is divided by 64 to produce the means value DC (i, j). This procedure needs only an adder and the shift of data. Further, the activity ACT (i, j) is attainable by using the mean value DC (i, j) and an absolute value circuit and an adder. The activity, therefore, can be calculated without resorting to a multipler and a divider.

Figure 4:
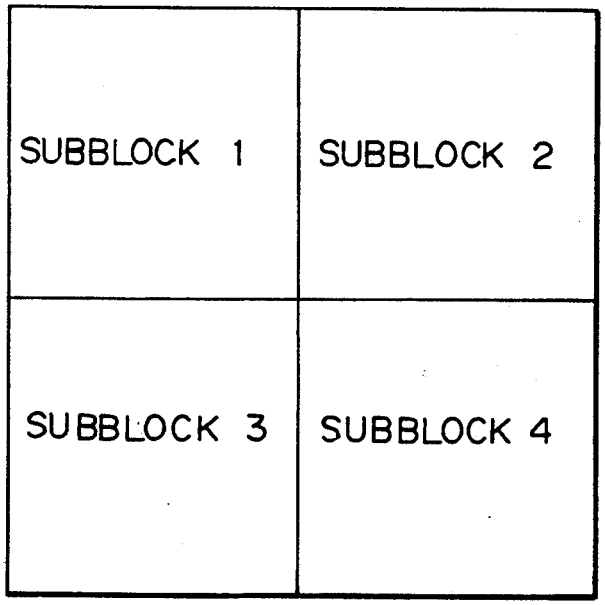
FIG. 4 depicts a block which is subdivided into subblocks.

FIG. 4 is representative of an alternative approach for the calculation of the block-by-block activity. As shown, one block is subdivided into four subblocks 1, 2, 3 and 4, and the activities are added together subblock by subblock. In this case, the activity ACT (i, j) in the block is determined by the following equation:

$$ACT(i,j) = \sum_{k=0}^{3} \sum_{l=0}^{3} |X(i+K, j+1) - DC(i,j,0)| +$$

$$\sum_{k=1}^{3} \sum_{l=0}^{3} |X(i+4+K, j+1) - DC(i,j,1)| +$$

$$\sum_{k=0}^{3} \sum_{l=0}^{3} |X(i+K, j+4+1) - DC(i,j,2)| +$$

$$\sum_{k=0}^{3} \sum_{l=0}^{3} |X(i+4+K, j+4+1) - DC(i,j,3)|$$

In the above equation, the first term to the fourth term indicate respectively the degrees of the first subblock to the fourth subblock to which high frequency components are predominant in the picture data. The first term, for example, is representative of the sum of the absolute values of differences between the individual picture data constituting the subblock 1 and the means value of the picture data of the subblock 11. This shows the degree to which high frequency components are predominant in the subblock 1.

By determining the degree of high frequency components contained in each subblock and adding the resulting degrees of all the subblocks as described above, it is possible to calculate the activity of the entire block with higher accuracy. Such an alternative procedure for the calculation of a block activity is also successful in eliminating the need for a multiplier and a divider.

Figure 9:
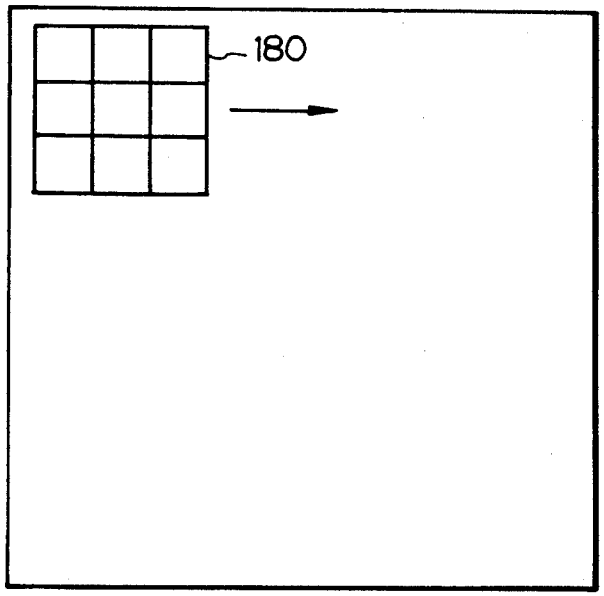
FIG. 9 indicates how an activity is calculated by using a filter.
Figure 10:
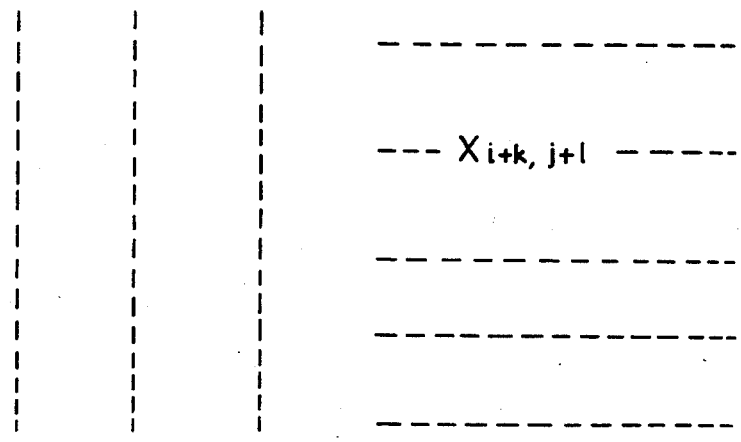
FIG. 10 shows an example of pixel data which form a block.

Referring to FIGS. 8A to 8C, there are shown specific forms of a filter which is another implementation for calculating the block-by-block activity. As shown in FIG. 9, any of such filters is sequentially moved from the top left to the bottom right of a block, as indicated by an arrow in the figure. The resulting pixel data outputted by the filter 180 are summed up to produce an activity of the particular block. For example, when the filter 180 shown in FIG. 8A is positioned at the top left of the block, it multiplies a pixel $X_{i+1, j+1}$ shown in FIG. 10 by 8 multiplies pixels $X_{i,j}$, $X_{i+1,j}$, $X_{i+2,j}$, $X_{i,j+1}$, $X_{i+2,j+1}$, $X_{i,j+2}$ and $X_{i+2,j+2}$ by $-1$. The resulting products are summed up to determined activity of the block. If the nine pixel data outputted by the filter 180 are identical, meaning that the pixels have no transitions and are DC components, the sum of the output pixel data of the filter 180 will be zero. By so scanning a block by the filter 180 and summing up the resulting pixel data, an activity of the block is determined. The filters shown in FIG. 8A to 8C, for example, may be selectively used in matching relation to frequencies to be emphasized in the event of calculation of an activity. This kind of approach also eliminates the need for a multiplier and a divider.

The block activity calculating section 20 delivers the activities ACT of the individual blocks which are produced by any of the above-described approaches to a normalizing coefficient selecting section 22. The normalizing coefficient selecting section 22 compares the activity ACT of each block with a threshold T and feeds a selection signal to the normalizing section 16. The selection signal is a (logical) ONE if the activity ACT is equal to or greater than the threshold T and a (logical) ZERO if the former is smaller than the latter. Since the activity ACT indicates the degree of a block to which high frequency components are predominant, the selection signal ONE shows that many high frequency components are present while the selection signal ZERO shows that many low frequency components are contained.

In response to the selection signal, the normalizing section 16 normalizes picture data or transform coefficients by applying either one of the two different kinds of normalizing coefficients, thereto, as stated previously. More specifically, the normalizing section 16 divides a block of picture data by a particular normalizing coefficient selected for that block.

Figure 5:
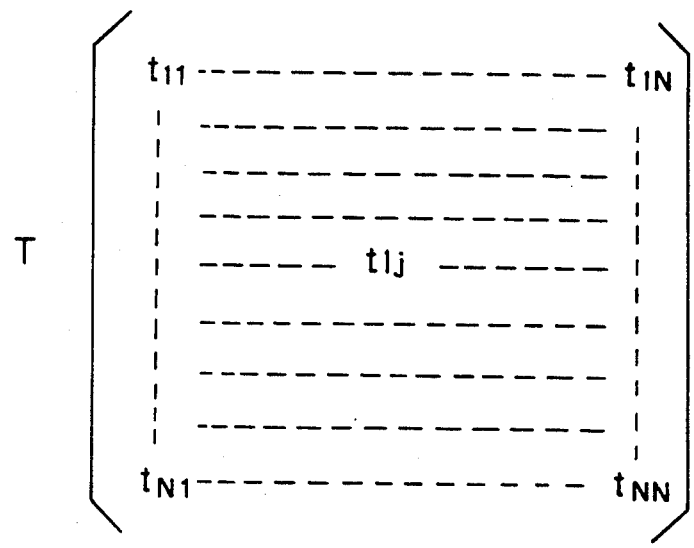
FIG. 5 shows an example of weight table data.
Figure 6:
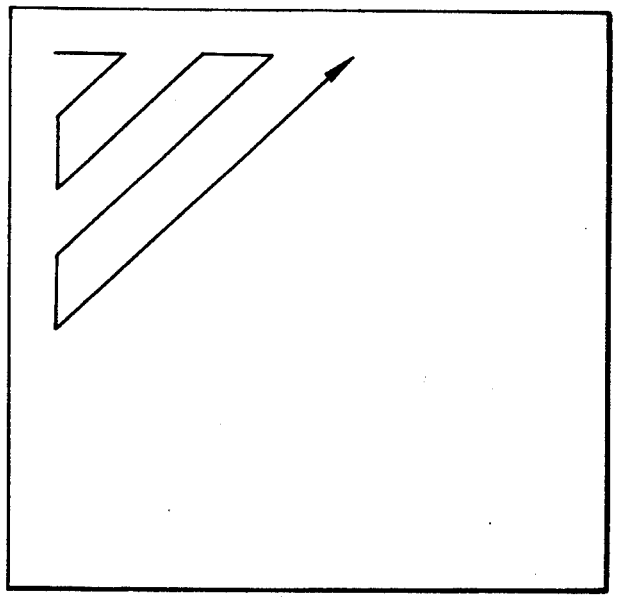
FIG. 6 indicates a sequence for coding run-lengths and non-zero amplitudes.

While the transform coefficients have been shown and described as being divided by a single selected normalizing coefficient $\alpha$, the normalizing coefficient $\alpha$ may be used in combination with a weight table T shown in FIG. 5. In the weight table T of FIG. 5, smaller values are assigned to lower frequency components, while larger values are assigned to higher frequency components, because transform coefficients lying in the lower frequency range are more important as data. The data shown in the weight table T are individually multiplied by the normalizing coefficient $\alpha$, and then the transform coefficients other than the discarded coefficients are divided by the individual products $\alpha \cdot T$ and thereby normalized. Assuming that a transform coefficient before the normalization is X, then the normalized transform coefficient X' is produced by:

$$X' = X/(\alpha \cdot T)$$

More specifically, the lower frequency and higher frequency data of the table T are respectively associated with the lower frequency and higher frequency components of the transform coefficients X. Each transform coefficient X is divided by the product of its associated table data and normalizing coefficient $\alpha$. The use of such a weight table T is advantageous over the simple division-by-$\alpha$ scheme because it divides the lower frequency components by smaller values and higher frequency components by larger values, i.e., provides the latter with a smaller and a larger compression ratio, respectively. Especially, a normalizing coefficient $\alpha$ available with high picture quality mode compression is inherently small. In such a mode, therefore, assigning larger values to the lower frequency components of the weight table T and smaller values to the lower frequency components is successful in reducing overflow which usually concentrates on lower frequency components.

The normalized transform coefficients are arranged in a block like the data before normalization as shown in FIG. 3. The block of normalized transform coefficients are sequentially scanned in a zig-zag fashion, the lower frequency components being first.

The output of the normalizing section 16 is applied to a two-dimensional Huffman coding section 28. In the normalized transform coefficients scanned zig-zag as stated above, zero often appears continuously. The Huffman coding section 28, therefore, determines the amount of continuously appearing zeros, i.e., a zero run-length and an amplitude of non-zeros. The zero run-length and the amplitude of non-zeros are fed to a multiplexer 64.

The selection signal outputted by the normalizing coefficient selecting section 22 is delivered to a run-length encoder 24 also. The run-length encoder 24 codes the run-lengths of ONEs and ZEROs of the selection signal. Since the selection signal is produced block by block and the activities of nearby blocks are often analogous, a ONE or a ZERO often appears continuously in the selection signal. The run-length encoder 24, therefore, determines the run-length of ONEs or that of ZEROs and codes the run-length. The output of the run-length encoder 24 is applied to the multiplexer 64.

The multiplexer 64 sequentially selects the coded picture data from the two-dimensional Huffman coding section 28 and the coded normalizing coefficient data from the run-length encoder 24 and feeds them out via an output terminal 32. The data appearing on the output terminal 32 may be fed to a transmission terminal, not shown, or recorded in a magnetic disk or similar recording medium.

As described above, in the illustrative embodiment, an activity representative of the proportion of high frequency components in a block is calculated block by block, and picture data are normalized block by block by selecting a particular normalizing coefficient. This allows picture data to be normalized on the block basis by an adequate normalizing coefficient.

Normalizing the whole picture by using a single normalizing coefficient has the following disadvantage. When a picture contains a substantial amount of high frequency components, for example, all the blocks are normalized by a relatively large normalizing coefficient, i.e., even the blocks containing many low frequency components are normalized by the large normalizing coefficient. The resulting picture data involve distortions resulting in the reproduced picture being deteriorated.

In contrast, the illustrative embodiment is capable of reproducing high quality pictures because it selects a normalizing coefficient block by block. Since a normalizing coefficient selection signal is fed out together with coded picture data as stated earlier, a decoding device can decode the picture data by using the block-by-block normalizing coefficients. Furthermore, the illustrative embodiment is successful in reducing the amount of data because the normalizing coefficient selection signal is outputted in the form of coded run-lengths.

While the illustrative embodiment selects one of two different normalizing coefficients by comparing an activity with a threshold value, use may be made of three or more normalizing coefficients, if desired.

Figure 2:
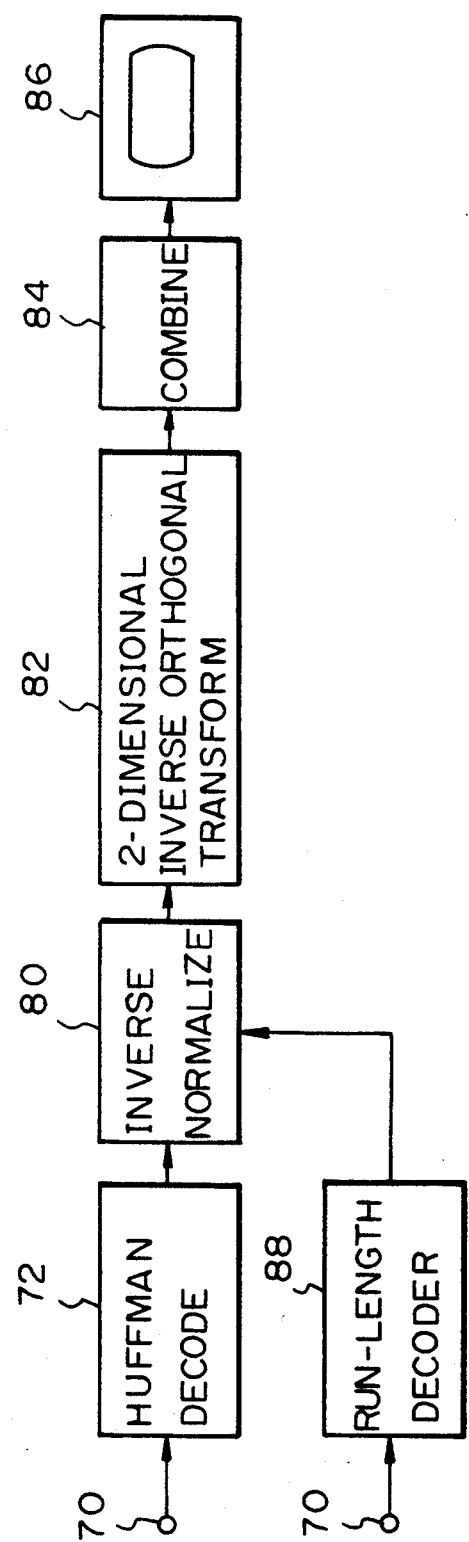
FIG. 2 is a schematic block diagram showing an expansion decoding device also embodying the present invention and constructed to decode picture data which are coded by the device of FIG. 1.

Referring to FIG. 2, a picture signal expansion decoding device also embodying the present invention is shown which decodes coded picture data from the coding device of FIG. 1 by expansion. As shown, the decoding device has an input terminal 70 to which the compressed picture data from the coding device of FIG. 1 are applied. The received picture data are fed to a Huffman decoding section 72. By using data which are fed from a Huffman table, not shown, the Huffman decoding section 72 decodes the input data to produce zero run-lengths and non-zero amplitude ranges and thereby the transform coefficients. The transform coefficients are fed from the Huffman decoding section 72 to an inverse normalizing section 80. On the other hand, the block-by-block normalizing coefficient data coming in through the input terminal 70 together with the picture data are applied to a run-length decoder 88. In response, the run-length decoder 88 decodes the block-by-block run-length coded normalizing coefficient data and delivers them to the inverse normalizing section 80.

The inverse normalizing section 80 inversely normalizes the decoded data fed thereto from the Huffman decoding section 72 by using the normalizing coefficient data which are outputted by the run-length decoder 88. More specifically, the inverse normalizing section 80 multiplies the decoded block-by-block picture data from the Huffman decoding section 72 by the normalizing coefficients, thereby inversely normalizing the input picture data. In the case that the decoded picture data from the Huffman decoding section 72 have been normalized by using a weight table such as the table T shown in FIG. 5, the inverse normalizing section 80 receives through the input terminal 70 data produced by multiplying the data T of the weight table by the normalizing coefficient $a$ and coding the products into run-lengths. In this case, the inverse normalizing section 80 will inversely normalize the picture data by multiplying the output data of the Huffman decoding section 72 by $a \cdot T$.

The output of the inverse normalizing section 80 is applied to a two-dimensional inverse orthogonal transforming section 82 and subjected to two-dimensional inverse orthogonal transform thereby. the inversely transformed output of the transforming section 82 is fed to a combining section 84. The combining section 84 combines the plurality of blocks of picture data to reconstruct the original picture data representative of the entire picture. The reconstructed picture data are applied to and displayed on a CRT (Cathode Ray Tube) 86 as a picture. If desired, the picture data may be delivered to a printer or similar recording apparatus.

The decoding device having the above construction is capable of decoding picture data coded by compression by the device of FIG. 1 by expansion. The inverse normalizing section 80 inversely normalizes picture data by using normalizing coefficients which are applied to the input terminal 70 together with the picture data and decoded by the run-length decoder 88. Hence, the decoding device can decode picture data in association with the normalizing coefficients which were selected block by block for coding. This allows the decoding device to decode picture data by use of various kinds of normalizing coefficients which are selected on a block basis. For example, block in which low frequency components are predominant and block in which high frequency components are predominant may be inversely normalized by multiplying their data by a small value and a large value, respectively. Inversely normalizing picture data by selecting an adequate normalizing coefficient block by block as stated above is successful in eliminating the drawback particular to conventional schemes which decode picture data having been normalized by applying the same normalizing coefficient to all the blocks. Should blocks containing many low frequency components be normalized by the same normalizing coefficient as applied to blocks in which high frequency components are predominant, a picture would be distorted and, therefore, the quality of a reproduction would be poor.

Furthermore, the decoding device is capable of decoding picture data by being supplied with data of a weight table. Hence, it is operable even when various kinds of weight table are used block by block at the time of coding.

Figure 7:
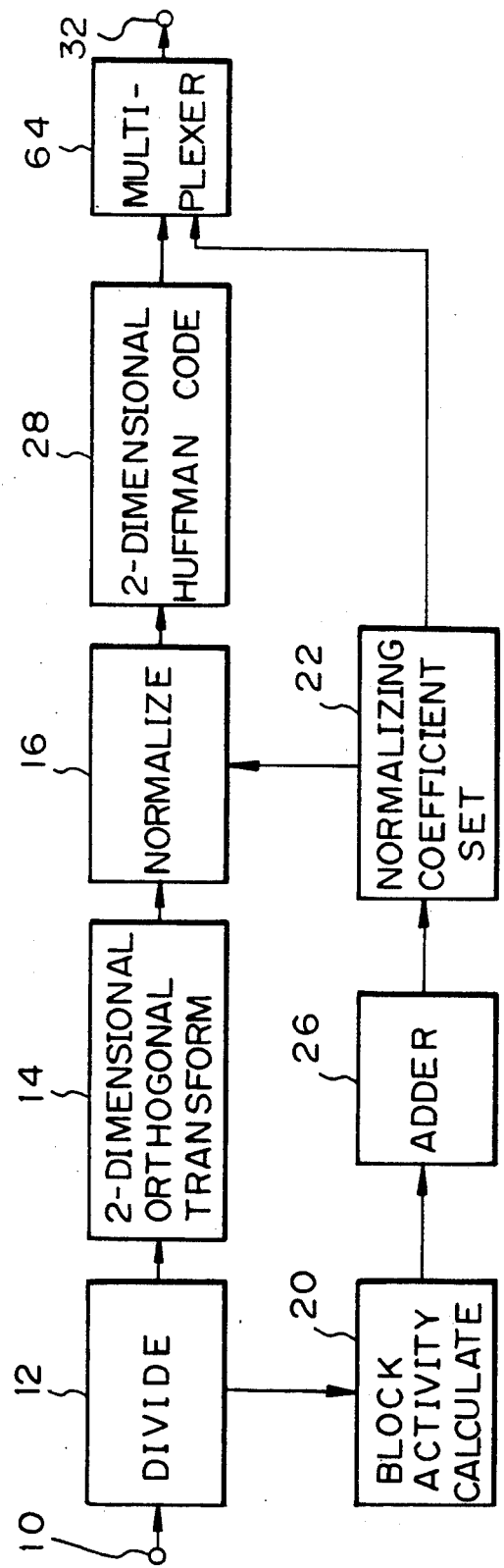
FIG. 7 is a block diagram schematically showing an alternative embodiment of the compression coding device in accordance with the present invention.

Referring to FIG. 7, an alternative embodiment of the picture signal coding device in accordance with the present invention will be described. In this particular embodiment, the block activity calculating section 20 is connected to an adder 26. The adder 26 sums up block-by-block activities fed thereto from the calculating section 20 to thereby produce a total activity. The total activity is applied to the normalizing coefficient setting section 22.

Figure 11A:
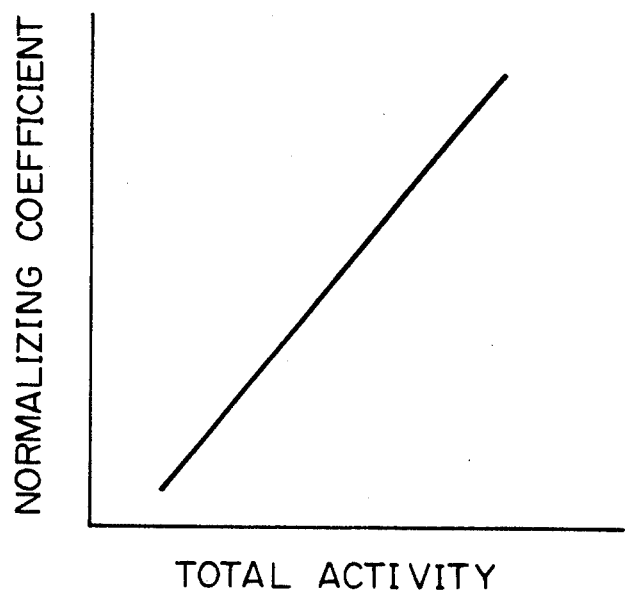
FIGS. 11A and 11B show look-up tables which may be used to convert the sum of activities into a normalizing coefficient.
Figure 11B:
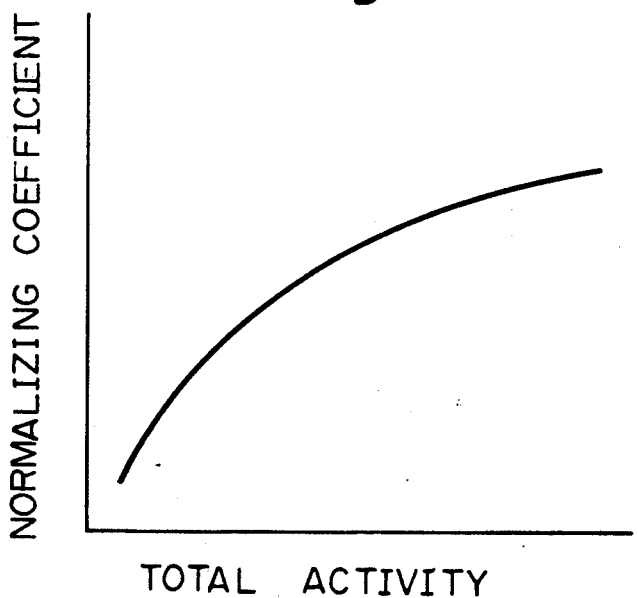

The normalizing coefficient setting section 22 sets up a normalizing coefficient in response to the total activity by using, for example, a look-up table stored in a storage, not shown, and the conversion which is shown in FIG. 11A or 11B. In FIG. 11A, the normalizing coefficient varies in proportion to the sum of activities while, in FIG. 11B, the normalizing coefficient increases at a lower rate than the sum of activities and promotes accurate coding. The normalizing coefficient setting section delivers the so determined normalizing coefficient to the normalizing section 16.

The normalizing section 16 normalizes the picture data by using the normalizing coefficient, i.e., divides each block of picture data by the normalizing coefficient. In the illustrative embodiment, since the normalizing coefficient is derived from the sum of the activities of the individual blocks, it is applied to all the blocks which constitute the entire picture.

As stated above, this particular embodiment sums the activities of individual blocks and, based on the total activity, selects a normalizing coefficient. Picture data are, therefore, normalized by a normalizing coefficient which matches the frequency components of the entire picture. Moreover, since the normalizing coefficients are so set as to maintain the amount of coded picture data constant, the amount of compressed picture data remains the same at all times. Picture data of this kind can be readily stored in a memory as needed.

The block-by-block activities and the sum thereof can be calculated by a simple linear circuit having an adder and a data shifter, i.e., without resorting to a multiplier and a divider. This simplifies the construction of the coding device. Since the coding device produces activities out of picture data, the coding device does without a buffer which would be required when activities were produced from data which has undergone orthogonal transform. It is to be noted that various kinds of look-up tables may be selected for producing a normalizing coefficient from the total activity so long as they maintain the amount of coded data constant. If desired, the normalizing coefficient may be determined by applying certain arithmetic operations to the sum of activities, instead of using look-up tables.

Figure 12:
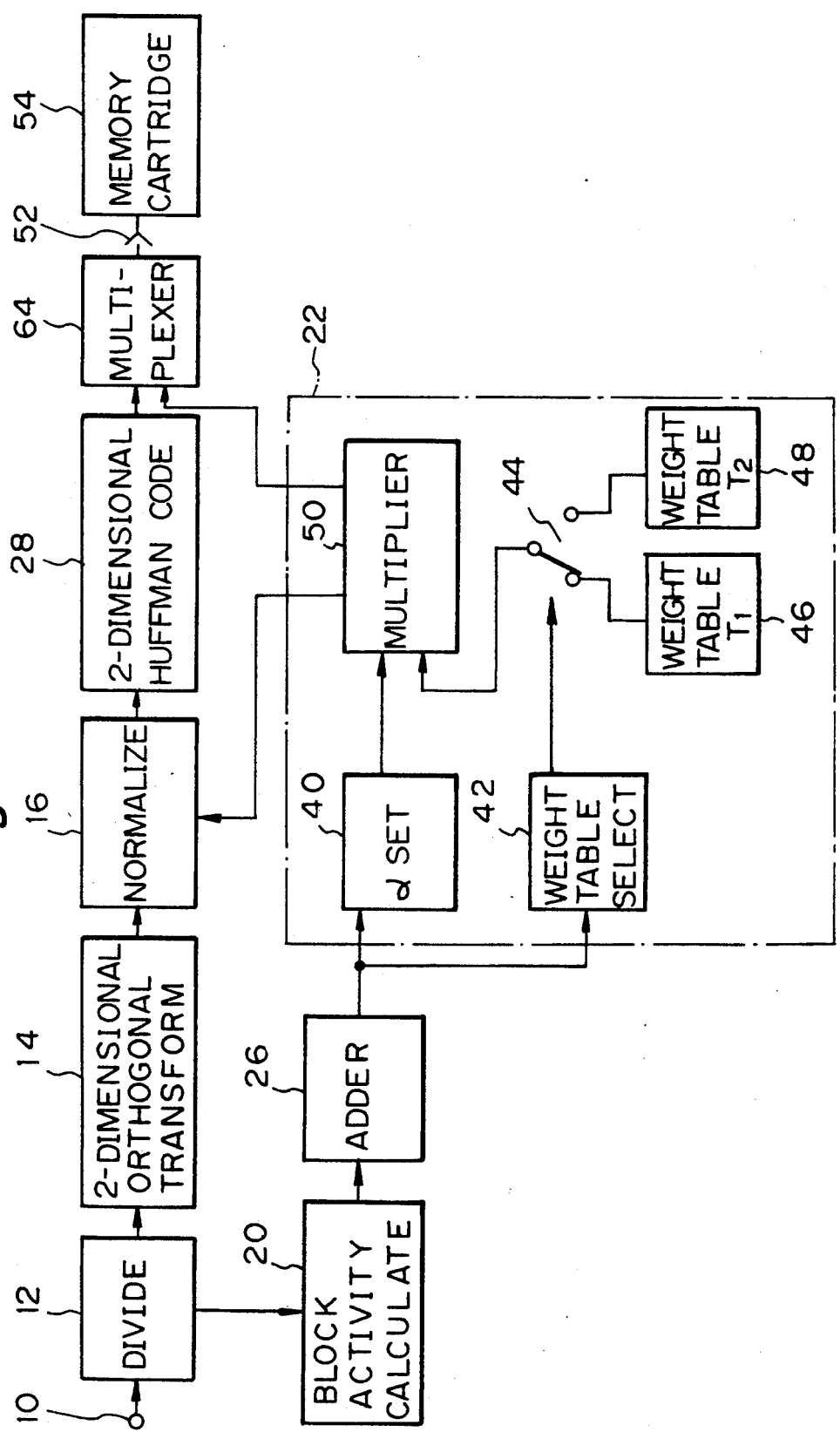
FIG. 12 is a schematic block diagram showing another alternative embodiment of the compression coding device in accordance with the present invention.

Referring to FIG. 12, still another alternative embodiment of the coding device in accordance with the present invention is shown. In this particular embodiment, the normalizing coefficient setting section 22 has an $\alpha$ setting subsection 40 and a weight table selecting subsection 42. The setting subsection 40 sets up a normalizing coefficient $\alpha$ in response to the sum of activities or total activity, as in the coding device of FIG. 7. The weight table selecting subsection 42 controls a switch 44 for connecting either one of two different weight tables T1 46 and T2 48 to a multiplier 50. Specifically, the weight table selecting subsection 42 selects either one of the weight tables T1 46 and T2 48 responsive to a total activity which is fed thereto from the adder 26. The weight tables T1 46 and T2 48 weight the individual blocks of picture data in the event of normalization.

Figure 13A:
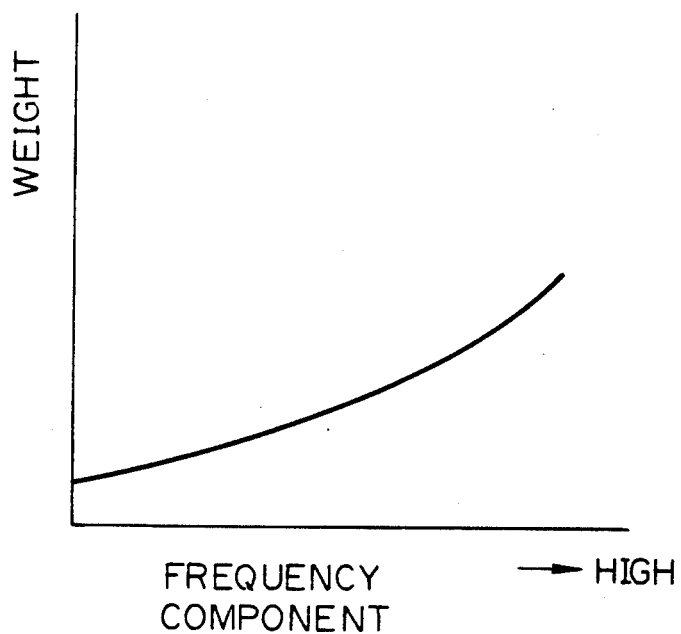
FIGS. 13A and 13B show the weights of data individually assigned to weight tables which are included in the device of FIG. 12.
Figure 13B:
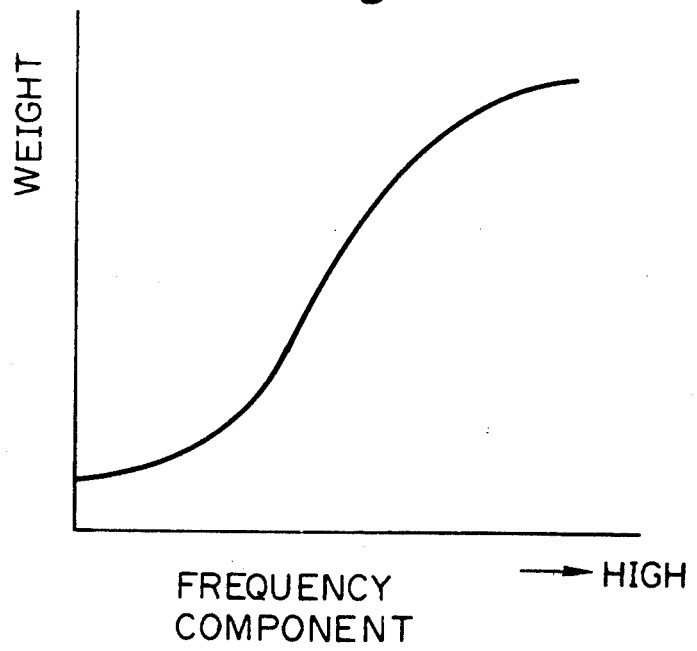

FIG. 5 shows a specific form of the weight tables T1 46 and T2 48. Assuming that one block of picture data has sixty-four pixels, for example, each of the weight tables T1 46 and T2 48 also has sixty-four data. The weight table data are individually multiplied by the normalizing coefficient $\alpha$ and then used to weight the individual frequency components. The weight tables T1 46 and T2 48 are assigned to pictures having relatively low total activities and pictures having relatively high total activities, respectively. Specifically, as shown in FIG. 13A, the weight table T1 46 stores weights which vary with the frequency component little by little. On the other hand, as shown in FIG. 13B, the weight table T2 48 stores weights a part of which is associated with high frequency components heavier than those of the weight table T1. When the weight table T2 is used, large values are assigned to high frequency components with the result that the transform coefficients of high frequency components are divided by the large values.

The weight table T2, therefore, causes more high frequency data to be discarded than the weight table T1. The weight table selecting subsection 42 selects the weight table T1 when the total activity outputted by the adder 26 is low and selects the other weight table T2 when the total activity is high.

The normalizing coefficient $\alpha$ set by the $\alpha$ setting subsection 40 and the weight table data T selected by the weight table selecting subsection 42 are fed to the multiplier 50. The multiplier 50 multiplies the weight table data T by the normalizing coefficient $\alpha$ to produce data $\alpha \cdot T$ and feeds it to the normalizing section 16. In response, the normalizing section 16 divides the transform coefficients fed from the orthogonal transforming section 14 by the input data $\alpha \cdot T$, thereby normalizing the transform coefficients.

The data $\alpha \cdot T$ produced by the multiplier 50 is fed to a multiplexer 64 also. The multiplexer 64 sequentially selects the coded data from the two-dimensional Huffman coding section 28 and the data $\alpha \cdot T$ from the normalizing coefficient setting section 22. The selected coded data are applied to a memory cartridge 54. Removably attached to a connector 52, the memory cartridge 54 records therein the coded picture data and the data $\alpha \cdot T$ used for the normalization.

The rest of the construction and operation of the illustrative embodiment are essentially the same as the embodiment of FIG. 7, and a redundant description will be avoided for simplicity.

As stated above, this particular embodiment selects either one of the weight tables T1 and T2 on the basis of the total activity so as to normalize transform coefficients by the selected weight table. Hence, a picture in which high frequency components are predominant has its high frequency area compressed more greatly and then normalized. The normalization is, therefore, effected in an optimal manner in association with the kind of a picture. The data used for the normalization are recorded in the memory cartridge 54 together with picture data, so that they are usable at the time of playback. Of course, the illustrative embodiment is practicable even with three or more different weight tables.

Referring to FIG. 14, a further alternative embodiment of the coding device in accordance with the present invention is shown. The activity calculating section 21 sums up the block-by-block activities to produce a total activity of a picture and delivers the total activity to the normalizing coefficient setting section 22. The normalizing coefficient setting section 22 sets a normalizing coefficient $\alpha$ based on the total activity. The normalizing coefficient $\alpha$ is applied to a divider 124 and a multiplier 126. The divider 124 divides a constant loaded therein beforehand by the normalizing coefficient $\alpha$. In this particular embodiment, the divider 124 divides a constant 1 by the coefficient $\alpha$ to produce a reciprocal $1/\alpha$. The reciprocal $1/\alpha$ is fed to a multiplier 134.

The illustrative embodiment has weight table storing sections 130 and 132 which store weight tables $T^{-1}$ and T, respectively. The weight table T stored in the storing section 132 lists data such as shown in FIG. 5, while the weight table $T^{-1}$ lists the reciprocals of the data of the weight table T.

The multiplier 134 multiplies the weight table $T^{-1}$ by the reciprocal $1/\alpha$ of the normalizing coefficient $\alpha$ and delivers the product $1/\alpha \cdot T$ to the normalizing section 16. In response, the normalizing section 16 multiplies the individual blocks of picture data by $1/\alpha \cdot T$. This normalizes the picture data because multiplying them by $1/\alpha \cdot T$ produces the same data as dividing the picture data by the normalizing coefficient $\alpha \cdot T$. Since the normalizing coefficient is derived from the sum of the block-by-block activities, it is common to all the blocks which constitutes the picture. If desired, the normalization may be executed by multiplying the picture data only by the reciprocal $1/\alpha$ of the normalizing coefficient which is fed from the divider 124, i.e., without using the weight table $T^{-1}$. In this case, the data produced by multiplying the picture data by $1/\alpha$ are also identical with the data produced by dividing them by $\alpha$.

The output of the normalizing section is applied to the two-dimensional Huffman coding section 28. The multiplier 126 multiplies the weight table T fed from the weight table storing section 132 by the normalizing coefficient $\alpha$ and delivers the product to the multiplexer 64. The multiplexer 64 sequentially selects the inputs from the coding section 28 and multiplier 126. Output data of the multiplexer 64 are sequentially written in a memory 140 via a connector 36. The memory 140 is implemented as a magnetic disk or similar recording medium and is removably mounted on the decoding device.

As stated above, this particular embodiment produces a reciprocal $1/\alpha$ of a selected normalizing coefficient $\alpha$ and then multiplies it by the reciprocals $T^{-1}$ of the weight table T to thereby attain $1/\alpha \cdot T$. The normalizing section 16, therefore, is capable of normalizing transform coefficients by multiplying them by $1/\alpha \cdot T$. Since the normalizing coefficient $\alpha$ is selected in matching relation to a picture, the transform coefficients are normalized by a normalizing coefficient which is optimal for the frequency components of the entire picture. Multiplying the transform coefficients by $1/\alpha \cdot T$ as described above is advantageous over dividing them by $\alpha T$ because it eliminates the need for a divider for normalization and thereby simplifies the construction of the coding device.

The divider 124 performs division only once for producing the reciprocal of the normalizing coefficient $\alpha$ which is fed thereto from the normalizing coefficient setting section 22. The normalizing section 16, therefore, does not need to divide the individual transform coefficient data by $\alpha$. This minimizes the number of dividers and thereby the scale of the coding device. In the case of color picture data, for example, the divider 124 will produce the reciprocal of the normalizing coefficient $\alpha$ for each luminance signal Y and chrominance signals R-Y and B-Y, while the normalizing section 16 will normalize the individual signal data by using the output of the divider 124.

Figure 15:
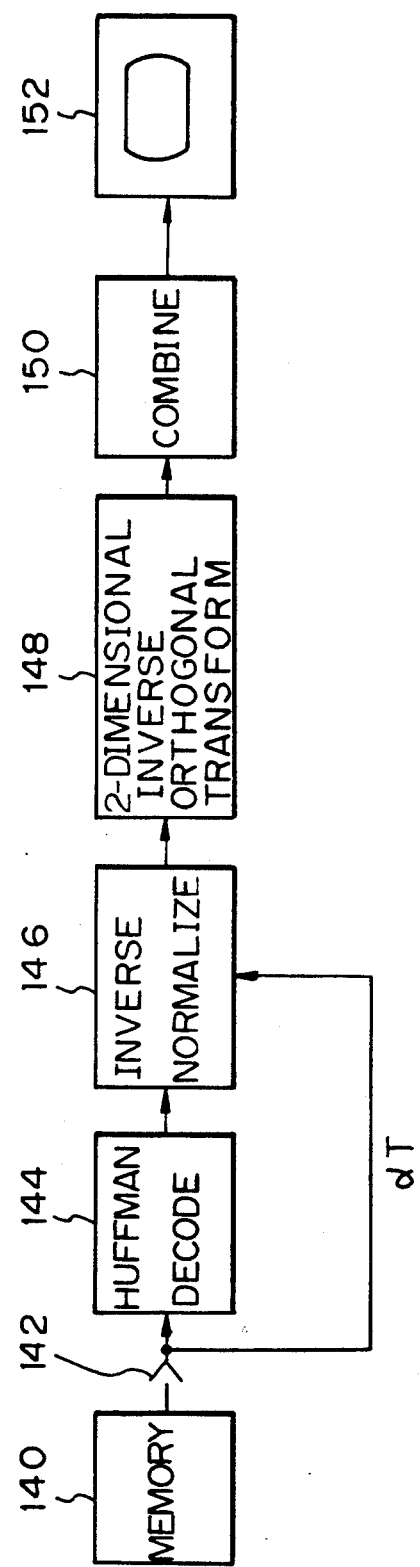
FIG. 15 is a schematic block diagram showing an alternative embodiment of the decoding device in accordance with the present invention which is constructed to decode picture data coded by the device of FIG. 1.

Referring to FIG. 15, an alternative embodiment of the decoding device which is associated with the coding device of FIG. 14 is shown. As shown, the memory 140 is removably attached to the decoding device. The coded picture data stored in the memory 140 as stated previously are applied to a Huffman decoding section 144 via a connector 142. The decoding section 144 decodes the input picture data and decodes the zero run-length and amplitude data to thereby recover the transform coefficients. The transform coefficients are delivered to an inverse normalizing section 146 to be inversely normalized thereby. Also delivered to the inverse normalizing section 146 is the normalizing coefficient $\alpha \cdot T$ which was written in the memory 140 from the multiplier 126 via the multiplexer 64. The inverse normalizing section 146 normalizes the decoded transform coefficients by multiplying them by the normalizing coefficient $\alpha \cdot T$.

The decoding device having the above construction inversely normalizes decoded transform coefficients or picture data by reading the normalizing coefficient $\alpha \cdot T$ out of the memory 140 and multiplying the picture data by $\alpha \cdot T$. The inverse normalization, therefore, does not need a divider, so that the decoding device is also simple in construction.

The coding device and decoding device shown in FIGS. 14 and 15, respectively, executes the normalization by using the reciprocal of a normalizing coefficient at the time of coding, i.e., without the need for a divider. Besides, an ordinary normalizing coefficient which is diferent from a reciprocal is also recorded together with coded data and used for the inverse normalization at the time of decoding. Hence, the decoding operation does not need a divider. Both the coding and decoding devices are, therefore, remarkably simplified in construction.

In summary, it will be seen that the present invention provides a coding device which normalizes individual blocks of picture data which has undergone orthogonal transform by applying a particular normalizing coefficient to each block on the basis of frequency components contained therein. This allows an adequate compression ratio to be selected on a block basis and thereby promotes efficient coding. The present invention also provides a decoding device which inversely normalizes the picture data by using the block-by-block normalizing coefficient data which were used by the coding device. Such coding and decoding procedures are successful in normalizing and coding picture data adequately block by block so as to eliminate distortions of a picture and enhance high quality playback.

The normalization is effected by using a normalizing coefficient which is derived from the sum of the activities of the individual blocks. This not only allows picture data to be compressed in matching relation to the frequency components of a picture, but also maintains the amount of coded data constant. Normalizing the entire picture by a single normalizing coefficient is effective to stabilize a reproduced picture.

Further, the coding device executes normalization by multiplying picture data by the reciprocal of a normalizing coefficient. Hence, picture data are normalized in conformity to the kind of a picture and, yet, the device is simple in construction because it does not need a divider. The decoding device inversely normalizes the picture data by multiplying them by the normalizing coeficient outputted by the coding device, i.e., without the need for a divider.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A picture signal compression coding device for coding digital picture data representative of a single picture by two-dimensional orthogonal transform, comprising:
   dividing means for dividing the digital picture data into a plurality of blocks of picture data;
   orthogonal transforming means for applying the two-dimensional orthogonal transform to the plurality of blocks of picture data to produce first data representative of resultant data;

normalizing means for normalizing the first data in accordance with a normalizing coefficient to produce second data representative of resultant data;

coding means for coding the second data to produce third data representative of resultant data; and normalizing coefficient setting means operative in response to said dividing means for selecting a normalizing coefficient appropriate for the plurality of blocks of picture data, and setting the selected normalizing coefficient to said normalizing means, said normalizing coefficient setting means including, block activity calculating means operative in response to said dividing means for calculating activities of the plurality of blocks of picture data, and activity adding means for producing a sum of the activities with respect to the single picture;

said normalizing coefficient setting means being adapted to select a normalizing coefficient on the basis of the sum of the activities.

2. A device in accordance with claim 1, wherein said coding means codes the normalizing coefficients set by said normalizing coefficient setting means together with the normalized data.

3. A device in accordance with claim 1, wherein said block activity calculating means calculates the activity of each of the blocks by summing up absolute values of differences between individual digital picture data including said individual blocks and a mean value of the digital picture data.

4. A device in accordance with claim 1, wherein said block activity calculating means calculates the activity of each of the blocks by subdividing each of the blocks into a plurality of subblocks, calculating activities of individual said subblocks, and summing up said activities.

5. A device in accordance with claim 1, wherein said block activity calculating means calculates the activity of each of the blocks by outputting pixel data including said individual blocks through a filter and summing out said pixel data.

6. A device in accordance with claim 1, wherein said normalizing coefficient setting means comprises a lookup table for converting the sum of the activities into the normalizing coefficient.

7. A device in accordance with claim 1, wherein said normalizing coefficient setting means comprises:

means for setting the normalizing coefficient in response to the sum of the activities; and means for selecting a weight table in response to the sum of the activities;

said normalizing coefficient setting means setting a value produced by multiplying the set coefficient and the selected weight table to produce the normalizing coefficient.

8. A device in accordance with claim 1, wherein said normalizing coefficient setting means sets a reciprocal of the normalizing coefficient in response to the digital picture data;

said normalizing means normalizing the first data by multiplying said first data by the reciprocal of the normalizing coefficient set by said normalizing coefficient setting means.

9. A device in accordance with claim 8, wherein said normalizing coefficient setting means sets the normalizing coefficient for normalization together with the reciprocal of said normalizing coefficient;

said device outputting the normalizing coefficient set by said normalizing coefficient setting means together with the picture data coded by said coding means.

10. A device in accordance with claim 9, wherein said normalizing coefficient setting means comprises weight table storing means for storing a weight table and a reciprocal of said weight table to produce the normalizing coefficient and a reciprocal of said normalizing coefficient, said normalizing coefficient setting means setting the normalizing coefficient by multiplying a coefficient set with said weight table and setting the reciprocal of said normalizing coefficient by multiplying the reciprocal of said coefficient set with the reciprocal of said weight table.

11. A picture signal compression coding device for dividing digital picture data representative of a single picture into a plurality of blocks and coding individual blocks of digital picture data by two-dimensional orthogonal transform, said device comprising:

orthogonal transforming means for applying the two-dimensional orthogonal transform to the individual blocks of digital picture data;

normalizing means for normalizing the data transformed by said orthogonal transforming means;

coding means for coding the data normalized by said normalizing means;

normalizing coefficient setting means for setting a normalizing coefficient to be used by said normalizing means for normalization and which matches the digital picture data;

block activity calculating means for calculating activities of the individual blocks of digital picture data; and activity adding means for producing a sum of the activities of the individual blocks of digital picture data calculated by said block activity calculating means;

said normalizing coefficient setting means setting said normalizing coefficient in response to the sum produced by said activity adding means;

said normalizing means normalizing the data by using the normalizing coefficient set by said normalizing coefficient setting means;

wherein said block activity calculating means calculates the activity of each of the blocks by summing up absolute values of differences between individual digital picture data including said individual blocks and a mean value of the digital picture data.

12. A picture signal compression coding device for dividing digital picture data representative of a single picture into a plurality of blocks and coding individual blocks of digital picture data by two-dimensional orthogonal transform, said device comprising:

orthogonal transforming means for applying the two-dimensional orthogonal transform to the individual blocks of digital picture data;

normalizing means for normalizing the data transformed by said orthogonal transforming means;

coding means for coding the data normalized by said normalizing means;

normalizing coefficient setting means for setting a normalizing coefficient to be used by said normalizing means for normalization and which matches the digital picture data;

block activity calculating means for calculating activities of the individual blocks of digital picture data; and activity adding means for producing a sum of the activities of the individual blocks of digital picture data calculated by said block activity calculating means;

said normalizing coefficient setting means setting said normalizing coefficient in response to the sum produced by said activity adding means;

said normalizing means normalizing the data by using the normalizing coefficient set by said normalizing coefficient setting means;

wherein said block activity calculating means calculates the activity of each of the blocks by subdividing each of the blocks into a plurality of subblocks, calculating activities of individual said subblocks, and summing up said activities.

13. A picture signal compression coding device for dividing digital picture data representative of a single picture into a plurality of blocks and coding individual blocks of digital picture data by two-dimensional orthogonal transform, said device comprising:

orthogonal transforming means for applying the two-dimensional orthogonal transform to the individual blocks of digital picture data;

normalizing means for normalizing the data transformed by said orthogonal transforming means;

coding means for coding the data normalized by said normalizing means; and normalizing coefficient setting means for setting a normalizing coefficient to be used by said normalizing means for normalization and which matches the digital picture data;

block activity calculating means for calculating activities of the individual blocks of digital picture data; and activity adding means for producing a sum of the activities of the individual blocks of picture data calculated by said block activity calculating means;

said normalizing coefficient setting means setting said normalizing coefficient in response to the sum produced by said activity adding means;

said normalizing means normalizing the data by using the normalizing coefficient set by said normalizing coefficient setting means;

wherein said block activity calculating means calculates the activity of each of the blocks by outputting pixel data including said individual blocks through a filter and summing out said pixel data.

* * * * *